(No Model.)

S. FOX.
MODE OF MAKING CORRUGATED TUBING.

No. 365,466. Patented June 28, 1887.

Witnesses:
Geo. H. Miatt
Wm. A. Pollock

Inventor:
Samson Fox
By his Attorneys
Foster & Freeman

United States Patent Office.

SAMSON FOX, OF LEEDS, COUNTY OF YORK, ENGLAND.

MODE OF MAKING CORRUGATED TUBING.

SPECIFICATION forming part of Letters Patent No. 365,466, dated June 28, 1887.

Application filed May 10, 1887. Serial No. 237,766. (No model.)

*To all whom it may concern:*

Be it known that I, SAMSON FOX, of Leeds, in the county of York, Kingdom of Great Britain, have invented a new and useful Improvement in the Manufacture of Tubes or Flues for Steam-Boilers, of which the following is a full, true, and exact description, reference being had to the accompanying drawings.

My invention consists in the formation of substantially cylindrical tubes or flues, specially applicable to steam-boilers, though not exclusively so, in which by the same thickness of the metal a greater and more uniform strength against crushing or destructive strain is obtained than when the same thickness of metal is formed into a true cylinder.

My invention consists in taking a sheet of steel to be formed into the tube, rolling it into a substantially cylindrical form with overlapping edges, welding the edges together in a uniform manner, and then by a suitable corrugating-machine corrugating the cylinder circumferentially into a series of uniform corrugations.

I am aware that it is not new to form a circumferentially-corrugated cylindrical tube or flue in which a flat sheet is corrugated, the edges are then brought together, and riveted or otherwise attached.

My improvement consists in the succession of steps which I have above named—namely, cutting a sheet of metal to the form desired, rolling it while smooth into a cylindrical form with overlapping edges and welding the edges together, and finally corrugating the same.

My invention is illustrated in the accompanying drawings, in which—

Figure 1:
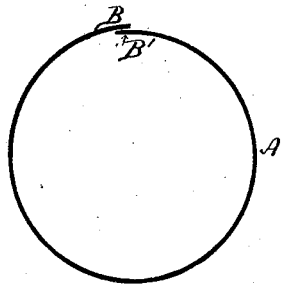
Figure 2:
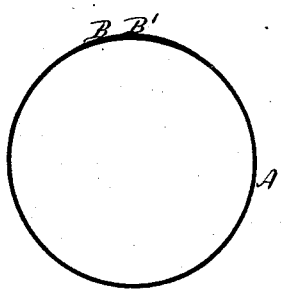
Figure 3:
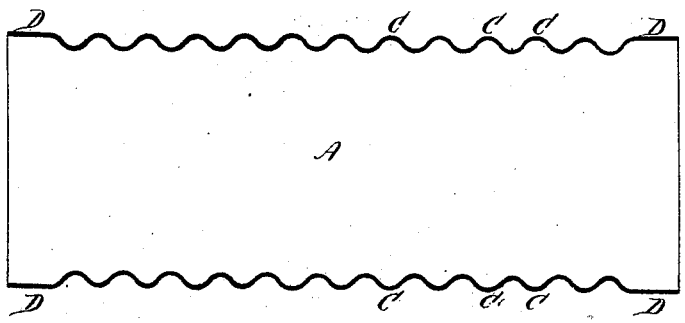

Figure 1 represents the first step of my invention, Fig. 2 the second step, and Fig. 3 the completed corrugated tube.

In the drawings the invention is shown as applied to a tube for steam-boilers.

In Fig. 1 a plate, A, of substantially rectangular form, of steel of suitable composition, or other suitable metal, by preference steel, has been rolled by hand or suitable mechanism into a cylindrical shape, having its edges overlapping at B B'. By suitable means the edges B B' are then welded together. This may be done by hand or by mechanism. The cylinder is then to be heated in a suitable furnace and placed between suitable corrugating-rolls, of which several forms have been patented, but I prefer those patented to me, and while hot is corrugated into the form shown in longitudinal section in Fig. 3. A small distance of the ends is preferably left cylindrical and without corrugations for the purposes of attachment. It will be observed that in the form shown these end cylindrical portions are of a diameter equal to or greater than the greatest diameter of the corrugated portions, and therefore the flue can be placed into or withdrawn from a boiler without destroying the supporting-plates.

By finally corrugating the flue after it has been heated for that purpose, I make a much more uniform and reliable product than has before been possible, and I further increase the strength of the weld and make said weld more uniform with the rest of the structure, as by this invention it is a second time caused to pass while hot between rollers, which serve to reduce any undesirable thickness at that point and to further solidify and make uniform the welded joint.

Though I have pointed out one form of tube or flue, my invention is not confined to that; but different shapes might be produced by having properly-shaped rollers.

In practice, after the final corrugation, I prefer to reheat the corrugated flue or tube for the purpose of annealing the same. This is not essential, but is a preferable step in completing the flue or tube.

What I claim as my invention, and desire to secure by Letters Patent, is—

The invention herein described of forming substantially-cylindrical corrugated metallic tubes, which consists in cutting a sheet to the desired shape, in rolling the same into a cylindrical form with overlapping edges, in heating said overlapping edges, in welding the same together, in reheating the entire tube, and finally in corrugating the same between suitable corrugating-rollers, thereby accomplishing the double result of solidifying the weld and circumferentially corrugating the tube, substantially as described.

In testimony whereof I have signed my name to this specification in the presence of two subscribing witnesses.

SAMSON FOX.

Witnesses:
HORACE P. MARSHALL,
BENJAMIN ARMITAGE.